Figure 1:
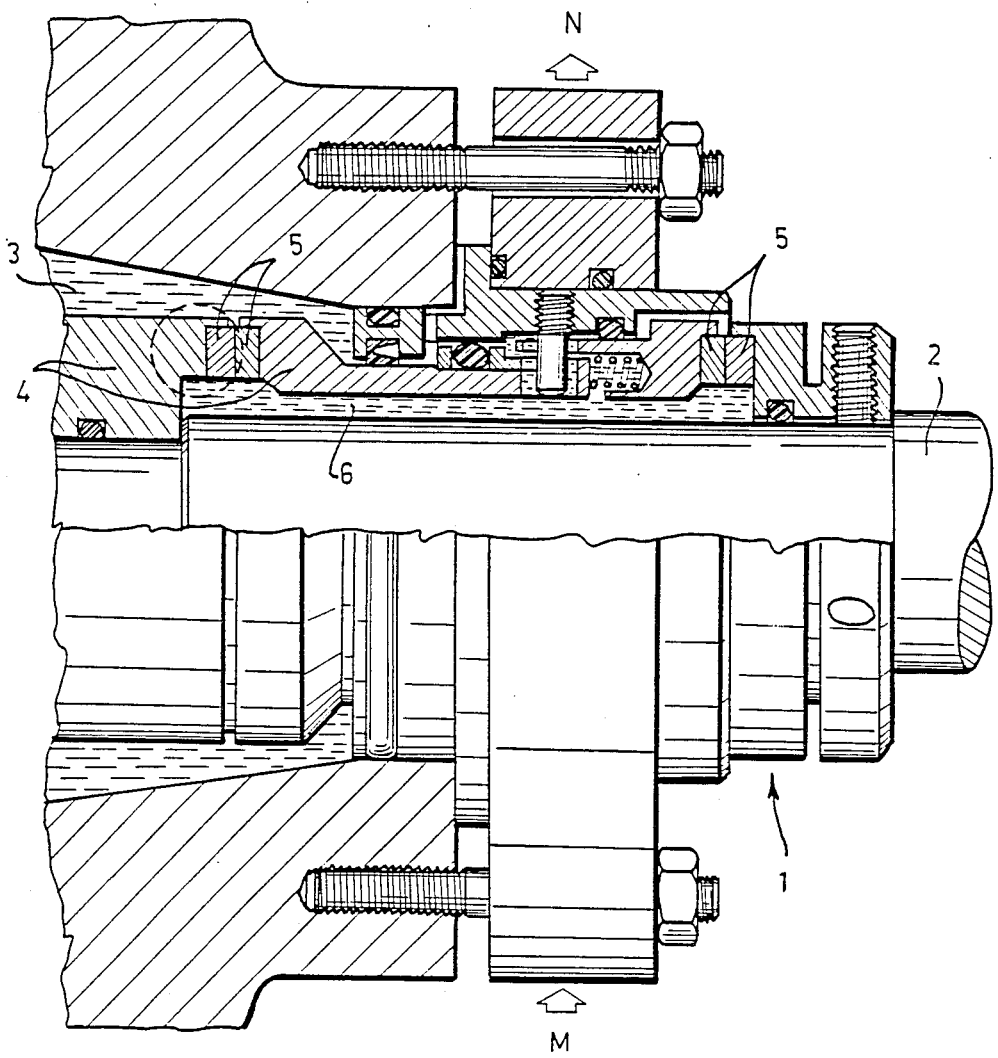

United States Patent [19]

Heilala

[11] Patent Number: 4,613,142
[45] Date of Patent: Sep. 23, 1986

[54] SLIDE-RING SEAL WITH DISTORTION PREVENTION CONSTRUCTION

[75] Inventor: Antti-Jussi Heilala, Järvenpää, Finland

[73] Assignee: Oy Safematic Ltd., Muurame, Finland

[21] Appl. No.: 814,412

[22] Filed: Dec. 30, 1985

[30] Foreign Application Priority Data

Jan. 16, 1985 [FI] Finland .................. 850190

[51] Int. Cl.$^4$ .................. F16J 15/34; F16J 15/38
[52] U.S. Cl. .................. 277/81 R; 277/9; 277/86; 277/93 SD; 277/96.1
[58] Field of Search .......... 277/9, 9.5, 1, 26, 81 R, 277/93 R, 93 SD, 96, 96.1, 85, 86

[56] References Cited

U.S. PATENT DOCUMENTS

| | | | |
|---|---|---|---|
| 3,144,253 | 8/1964 | Schirmer | 277/96 X |
| 3,410,566 | 11/1968 | Wiese | 277/81 R |
| 3,717,353 | 2/1973 | Rayfield | 277/96.1 |
| 3,738,667 | 6/1973 | Symons | 277/96 |
| 4,261,581 | 4/1981 | Hershey | 277/9 |
| 4,405,134 | 9/1983 | Sargent et al. | 277/96.1 X |

Primary Examiner—Robert S. Ward
Attorney, Agent, or Firm—Cushman, Darby & Cushman

[57] ABSTRACT

A slide-ring seal for sealing a shaft rotating with respect to a wall. The slide-ring sealing comprises a frame portion provided with connections for a sealing liquid and seal rings (4) provided with slide rings (5), which seal rings are so positioned with respect to each other that the sealing slide surfaces of the slide rings (5) are pressed against each other and rotate with respect to each other. Each slide ring (5) is thereby fastened on the seal ring (4) thereof by means of a shrinkage fit in such a manner that a radial press force ($F_K$) of the shrinkage fit is wholly directed to act on the center of mass (K) of the cross-sectional area of the slide ring (5). In order to prevent distortion of the slide surface of the slide ring (5), an axial force ($F_L$) created by deformations of the seal ring is wholly directed to act on the center of mass (K) of the cross-section of the slide ring (5).

5 Claims, 3 Drawing Figures

SLIDE-RING SEAL WITH DISTORTION PREVENTION CONSTRUCTION

The invention relates to a slide-ring seal for sealing a shaft rotating with respect to a wall, said slide-ring seal comprising a frame portion provided with connections for a sealing liquid, and seal rings provided with slide rings and positioned with respect to each other in such a manner that the sealing slide surfaces of the slide rings are pressed against each other and rotate with respect to each other, whereby each slide ring is fastened on the seal ring thereof by means of a shrinkage fit so that the radial press force of said shrinkage fit is wholly directed to act on the centre of mass of the cross-sectional area of the slide ring.

This kind of seals are extremely well-known in various technical fields. Slide-ring seals are particularly suitable for e.g. pumps used in heavy process industries, by means of which pumps liquids containing solids and impurities are pumped.

Under wearing condition, the proper slide rings of the slide-ring seals are generally manufactured of e.g. hard metals, oxide ceramics or silicon carbides. The reason for the use of said wear-resistant materials is that while rotating against each other, the slide rings are subjected to both adhesive and abrasive wearing. The frame portions of the seals are normally manufactured of e.g. acid-proof steel. It is obvious that the materials, however, are always selected in accordance with the operational situtation in each particular case.

In previously used solutions, the wear-resistant slide rings of a slide-ring seal have been set into the slide ring thereof by means of a shrinkage fit by first heating the seal ring so that it has expanded to such an extent that it has been possible to fit the slide ring into a recess machined in the seal ring. When the seal ring is cooling, the slide ring gets squeezed and is thereby fixed in place. A disadvantage of this way of fastening is that the slide surface of the slide ring gets distorted as a result of a press force acting in the radial direction. It is obvious that such distortion can be adjusted by machining of the slide surface at the production stage, while considerable distortions of the slide surface from the original planar surface may occur in an operational situation when the temperature may notably differ from the temperature of the machining of the slide surface. Obviously enough, an efficient sealing cannot be provided by means of such a distorted surface. In addition, it has been found out in practice that slide rings fixed as described above wear out rapidly, because the slide surfaces of the slide rings which are positioned against each other in operation are not in parallel with each other all over the slide surfaces thereof, but some edge portions are near each other, others correspondingly being at a greater distance from each other. In other words, the slide surfaces are at an angle with respect to each other. The problem is further aggravated by the tendency of the seal ring to get distorted in use. This takes place e.g. under the action of thermal expansion in such a manner that the outer periphery of the seal ring expands by virtue of a warm product to a greater extent than the inner periphery cooled by the sealing liquid or air. The pressure of the product also causes distortion in the same direction.

Said disadvantages have already long been known and there exists several solutions which have been developed for the elimination of said disadvantages. An example of such solutions would be the solutions disclosed in U.S. Pat. No. 4,261,581. It is known from said U.S. publication to direct the radial press force of the shrinkage fit to the centre of the cross-sectional area of the slide ring. As stated in the publication, too, a solution of this kind, however, is not sufficiently good, as the axial deformations in the seal ring still distort the slide surface of the slide ring. So it is the provision of an axial clearance between the slide ring and the seal ring that is disclosed as an invention in U.S. Pat. No. 4,261,581, the slide ring being supported on the seal ring merely by means of a radial supporting force acting through the centre of the cross-sectional area of the slide ring. A disadvantage of this solution is that the slide ring must be extremely rigid on account of the missing axial support. Further, heat transfer from the slide ring to the seal ring is particularly difficult, because the area of support of the slide ring is small.

The object of the invention is to provide a slide-ring seal which avoids the disadvantages of the previous solutions. This is achieved by means of a slide-ring seal according to the invention, which is characterized in that the axial force created by deformations of the seal ring is wholly directed to act on the centre of mass of the cross-section of the slide ring.

An advantage of the invention is that the slide ring is extremely efficiently supported both radially and axially so that the slide surface will not get distorted. In addition, the construction according to the invention is simple, whereby the production costs are very advantageous. Due to the advantageous supportion of the slide ring, also the operational costs are very advantageous. One reason for the advantageous operational costs is that the slide surfaces positioned against each other are accurately in parallel in an operational situation, whereby the sealing effect is good and no uneven wearing occurs.

Figure 2:
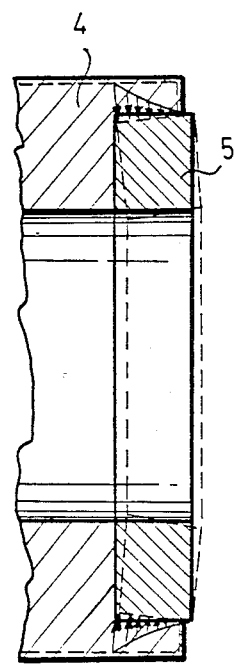
Figure 3:
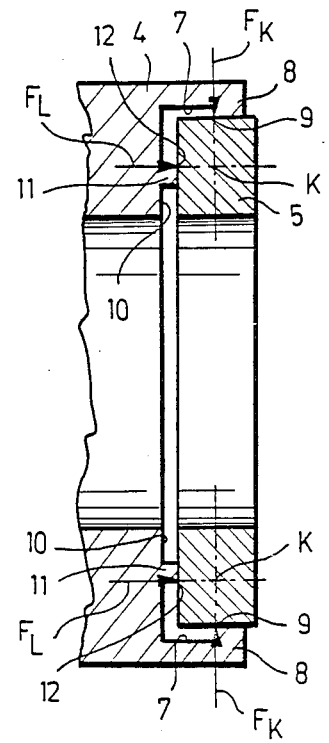

The invention will be more closely described in the following by means of the prior art disclosed in the attached drawings and one preferred working example of the invention, whereby FIG. 1 illustrates the principal features of a specific known slide-ring seal construction, FIG. 2 is an enlarged view of a fastening structure of a slide ring, which structure is used in connection with the known construction of FIG. 1, FIG. 3 illustrates the principal features of a fastening structure of a slide ring according to the invention.

FIG. 1 shows the principal features of a slide-ring seal construction known in the art. In the figure, a frame portion of the seal construction is generally indicated by the reference numeral 1. A rotating shaft e.g. a pump shaft, is indicated by the reference numeral 2. The product to be pumped, in turn, is indicated by the reference numeral 3. Seal rings in the slide-ring seal are indicated by the reference numeral 4 and slide rings attached to the seal rings correspondingly by the reference numeral 5. A sealing liquid forming a lubrication film between the slide surfaces of the slide rings 5 is indicated by the reference numeral 6 in FIG. 1. Further, the arrows M and N of the figure generally indicate an inlet and outlet respectively of the sealing liquid. Said matters all belong to the prior art, so the construction according to FIG. 1 is not more closely described here.

The circle in FIG. 1 indicates a point which is schematically shown as an enlarged view in FIG. 2. However, it is obvious that FIG. 2 can illustrate any of the slide rings shown in FIG. 1. The same reference numerals as in FIG. 1 are used at corresponding points in FIG.

2. In the known construction according to FIG. 2, the slide ring 5 is fastened on the seal ring 4 by means of a radially acting shrinkage fit. Said shrinkage fit is formed in a manner known per se by heating the seal ring 4, which thereby expands. The slide ring 5 is thereafter positioned in the expanded seal ring, which shrinks when cooling, whereby the slide ring 5 is fastened on the seal ring 4. The continuous lines is FIG. 2 illustrate a situation, in which the slide ring 5 is fitted in the heated seal ring 4 and the broken lines a situation which arises after the cooling of the seal ring. In addition, the effect of the radial shrinking force is shown in principle by means of arrows in FIG. 2. It is obvious that the situation shown by the broken lines in FIG. 2 is strongly exaggerated as distortions of such dimensions do not occur in the reality. Nevertheless, it is a fact that the slide surface of the slide ring 5, which in FIG. 2 is represented by the right-hand free surface, is distorted in principle as shown in FIG. 2. The conical form of the slide ring 5 caused by cooling can be removed by grinding the slide surface so that it becomes planar. The problem, however, is not eliminated by means of said grinding, for in practice the slide ring 5 is distorted into a cup-like shape when operating at temperatures exceeding the grinding temperature, because the seal ring 4 expands and the press force exerted on the slide ring 5 is reduced. The term "cup-like" means in this connection that the slide surface of the slide ring forms a cup-like surface, i.e. the inner periphery of the slide surface is located deeper than the outer periphery. The above-mentioned phenomena and measures all belong to the prior art.

The disadvantages mentioned above can be eliminated by means of the invention shown in FIG. 3. FIG. 3 is a schematical view of the same detail as in FIG. 2. In FIG. 3, the seal ring and the slide ring are indicated by the same reference numerals as in FIG. 2. The invention shown in FIG. 3 is based on the idea that all forces acting on the slide ring 5 are directed to a centre of mass K of the rectangular cross-section of the slide ring. By virtue of said arrangement, no disadvantageous distortion of the slide surface of the slide ring occurs. The radial supporting force $F_K$ of the shrinkage fit is thereby in a manner known per se directed to act on the peripheral surface of the slide ring by means of a rib 8 provided on an axially directed peripheral counter surface 7 of the seal ring 4. Said rib 8 is formed in such a manner that an edge 9 thereof, which is positioned at a greater distance as view from the slide surface, is positioned in the radial plane of the slide ring, which plane extends through the centre of mass K. By means of said arrangement, the radial supporting force is made to act through the centre of mass K, because the engagement between the seal ring 4 and the slide ring after the cooling of the seal ring 4 is effected through said edge 9 in particular, as stated in U.S. Pat. No. 4,261,581, for instance.

According to the invention, also the axial force $F_L$ created by deformations of the seal ring 4 is wholly directed to act on the centre of mass K of the cross-section of the slide ring 5. This is carried out in practice in such a manner that said axial supporting force $F_L$ is directed to the slide ring 5 by means of a rib 11 provided on a radial counter surface 10 of the seal ring 4. Said rib 11 is thereby fitted so that a radially outer edge 12 thereof is positioned on an axially directed cylinder surface extending through the centre of mass K. By means of said arrangement, the axial supporting force $F_L$ is made to act through the centre of mass K, because the engagement between the seal ring 4 and the slide ring 5 is effected after the cooling through said edge 12 of the rib 11.

The invention enables supporting of the slide ring 5 in place so that no distortion of the slide surface occurs. Further, the slide ring is extremely efficiently supported both in the axial and in the radial direction, wherefore the slide rings do not have to be especially rigid.

In order to ensure heat transfer from the slide ring 5 to the seal ring 4, it is also advantageous that the surface area of the rib 9 bearing on the peripheral surface of the slide ring is essentially $\frac{1}{2}$ to $\frac{1}{4}$ of the area of the peripheral surface of the slide ring. Correspondingly, the surface area of the rib 11 bearing on the frontal surface of the slide ring is essentially $\frac{1}{2}$ to $\frac{1}{4}$ of the area of the frontal surface of the slide ring. Said arrangement ensures that a sufficient heat transfer surface is provided between the slide ring 5 and the seal ring 4.

The embodiment disclosed above is by no means intended to restrict the invention, but the invention can be modified within the scope of the claims in various ways. So it is obvious that any suitable sealing or glueing material capable of maintaining the resilience thereof can be inserted into the closed space formed between the ribs 8 and 9, if this is considered necessary. It is likewise obvious that the different parts do not necessarily have to be exactly similar to those shown in the figures, but other kinds of parts can be used as well. In addition, one or more cooling channels can be conducted into the closed space between the ribs 9 and 11, if required.

I claim:

1. Slide-ring seal for sealing a shaft (2) rotating with respect to a wall, said slide-ring seal comprising a frame portion provided with connections for a sealing liquid, and seal rings (4) provided with slide rings (5) and positioned with respect to each other in such a manner that the sealing slide surfaces of the slide rings (5) are pressed against each other and rotate with respect to each other, whereby each slide ring (5) is fastened on the seal ring (4) thereof by means of a shrinkage fit so that the radial press force ($F_K$) of said shrinkage fit is wholly directed to act on the centre of mass (K) of the cross-sectional area of the slide ring (5), characterized in that the axial force ($F_L$) created by deformations of the seal ring (4) is wholly directed to act on the centre of mass (K) of the cross-section of the slide ring (5).

2. Slide-ring seal according to claim 1, wherein the radial press force ($F_K$) of the shrinkage fit is directed to a peripheral surface of the slide ring (5) by means of a rib (9) provided on an axially directed peripheral counter surface (7) of the seal ring (4), characterized in that the axial force ($F_L$) created by deformations of the seal ring (4) is directed to the slide ring (5) by means of a rib (11) provided on a radial counter surface (10) of the seal ring (4).

3. Slide-ring seal according to claim 2, wherein the size of the surface of the seal ring (4) bearing on the peripheral surface of the slide ring (5) is essentially $\frac{1}{2}$ to $\frac{1}{4}$ of the area of the peripheral surface of the slide ring (5), characterized in that the size of the surface of the seal ring (4) bearing on the frontal surface of the slide ring (5) is $\frac{1}{2}$ to $\frac{1}{4}$ of the area of the frontal surface of the slide ring (5).

4. Slide-ring seal according to claim 2, characterized in that the cavity between said rib (9) transmitting the radial press force ($F_K$) and said rib (11) transmitting the axial force ($F_L$) is filled with a resilient glueing or sealing material.

5. Slide-ring seal according to claim 2, characterized in that one or more cooling channels are conducted into the cavity between said ribs (9) and (11).

* * * * *